United States Patent
Schmidt et al.

[19]

[11] Patent Number: 5,881,962

[45] Date of Patent: *Mar. 16, 1999

[54] MASS-BODY DRIVE FOR A ROTARY TIGHTENING DEVICE

[75] Inventors: Thomas Schmidt, Timmendorfer Strand; Klaus Butenop, Herzhorn; Doris Kröger, Tornesch; Jörg Barckmann, Tornesch-Ahrenlohe; René Rade, Hamburg, all of Germany

[73] Assignee: Autoliv Development AB, Vargarda, Sweden

[*] Notice: The term of this patent shall not extend beyond the expiration date of Pat. No. 5,690,295.

[21] Appl. No.: 732,355

[22] PCT Filed: Apr. 11, 1995

[86] PCT No.: PCT/SE95/00388

§ 371 Date: Oct. 11, 1996

§ 102(e) Date: Oct. 11, 1996

[87] PCT Pub. No.: WO95/27638

PCT Pub. Date: Oct. 19, 1995

[30] Foreign Application Priority Data

Apr. 11, 1994 [DE] Germany ............... 44 12 150.4
Jun. 30, 1994 [DE] Germany ............... 44 22 450.8

[51] Int. Cl.[6] .................. B65H 75/48; B60R 22/34
[52] U.S. Cl. .................. 242/374; 280/807; 60/905
[58] Field of Search ............... 242/374; 280/806, 280/807; 297/475, 476, 478; 60/905

[56] References Cited

U.S. PATENT DOCUMENTS 3,552,222  1/1971  Eck ........................... 74/216.3
5,690,295  11/1997  Steinberg et al. ........... 242/374

FOREIGN PATENT DOCUMENTS

2618119  10/1977  Germany.
2931164  2/1981  Germany.
2814487  11/1983  Germany.
3220498  12/1983  Germany.

*Primary Examiner*—John Q. Nguyen
*Attorney, Agent, or Firm*—Robert W. Becker & Associates

[57] ABSTRACT

A rotary tightening device for a safety belt has a belt retractor including a housing and a belt take-up shaft rotatably supported in the housing. The belt-take-up shaft has one end of the safety belt connected thereto. Upon triggering of the rotary tightening device, the belt take-up shaft is rotated in a belt take-up direction of the safety belt. A drive wheel is connected to the shaft. The housing has a channel extending in a plane parallel to a radial plane of the drive wheel and extending at least partially about a circumference of the drive wheel. Mass bodies are positioned loosely adjacent to one another in the channel. The mass bodies, when accelerated, act on the drive wheel for driving it. The drive wheel has at the circumference a gearing in which the mass bodies are received for driving the drive wheel. A spacing of the gearing is substantially identical to a spacing between the mass bodies.

41 Claims, 6 Drawing Sheets

MASS-BODY DRIVE FOR A ROTARY TIGHTENING DEVICE

BACKGROUND OF THE INVENTION

The invention relates to a rotary tightening device for a safety belt, particularly in motor vehicles, having a belt retractor, whose belt take-up shaft upon triggering of the rotary tightening device coupled thereto is rotated in the take-up direction of the safety belt, there being associated with the belt take-up shaft, as a drive, a driving wheel in whose plane the housing of the belt retractor forms a channel, which embraces the driving wheel over at least part of its periphery, for the through passage of mass bodies acting as driving means upon the driving wheel and lying loosely adjacent to one another in the channel.

The basic construction of a rotary tightening device having the features mentioned above is described in DE 29 31 164 A1; in the known rotary tightening device, the belt take-up shaft is provided with a driving wheel, the housing in the plane of the driving wheel having a channel which embraces the driving wheel over part of its periphery; in said channel, mass bodies are driven under the action of a pyrotechnic drive out of a tube disposed tangentially to the driving wheel or the channel and as a result of their friction-locking connection to the driving wheel, which for said purpose is provided with a circumferential contoured groove, set said driving wheel in rotation as they run through the channel. According to an embodiment, the mass bodies may take the form of balls made of a suitably hard plastics material. An outlet opening for the mass bodies may be provided at the end of the channel, the mass bodies exiting from the channel through said outlet opening and passing into a suitably provided receiving container.

A drawback of said known rotary tightening device is that the drive is effected through friction locking; consequently, on the one hand, considerable energy is lost and, on the other hand, it is difficult to tune the contoured groove and the mass bodies to one another in such a way as to produce a defined friction lock and prevent the mass bodies from becoming wedged or sliding through without power transmission. A further drawback associated with the known rotary tightening device is that-when the hard mass bodies encounter the driving wheel, because the channel for sealing reasons has only slight clearance, a mutual blocking between the periphery of the driving wheel and the mass bodies may arise in the channel, thereby impairing the efficiency of the drive in the event of triggering.

The object of the invention is therefore to improve a rotary tightening device having the features described initially in such a way that the transmission of the drive power, which is imparted to the mass bodies, to the tightening rotation of the belt take-up roller is improved.

SUMMARY OF THE INVENTION

A rotary tightening device for a safety belt according to the present invention is primarily characterized by:
- a belt retractor comprising a housing and a belt take-up shaft rotatably supported in the housing, the belt-take-up shaft having one end of the safety belt connected thereto and, upon triggering of the rotary tightening device, being rotated in a belt take-up direction of the safety belt;
- a drive wheel connected to the shaft;
- the housing having a channel extending in a plane parallel to a radial plane of the drive wheel and extending at least partially about a circumference of the drive wheel;
- mass bodies positioned loosely adjacent to one another in the channel;
- the mass bodies, when accelerated, acting on the drive wheel for driving the drive wheel;
- the drive wheel having at the circumference a gearing in which the mass bodies are received for driving the drive wheel, wherein a spacing of the gearing is substantially identical to a spacing between the mass bodies.

The gearing is designed such that the mass bodies, when received in the gearing, contact one another.

The gearing is preferably comprised of recesses projecting radially inwardly from the circumference of the drive wheel.

The gearing is advantageously comprised of cup-shaped recesses at the circumference of the drive wheel, the cup-shaped recesses having a shape matching a shape of the mass balls.

The cup-shaped recesses are expediently positioned along the entire circumference and are contiguous.

The cup-shaped recesses are preferably positioned along the entire circumference and slightly overlap one another.

The mass bodies are balls and the cup-shaped recesses are spherical half-shells.

The radius of the cup-shaped recesses originates at a circle defined by the theoretical points of contact of successive ones of the balls and extends to a center of the circle.

Preferably, the cup-shaped recesses widen radially outwardly in a funnel shape.

The cup-shaped recesses have transitions into neighboring ones of the cup-shaped recesses. The transitions between the cup-shaped recesses are produced by rolling a milling cutter for milling the cup-shaped recesses along a circular path, having a radius identical to the radius of the cup-shaped recesses.

The outside diameter of the drive wheel is greater than the thrust diameter by a distance $\leq$ a diameter of the balls.

The rotary tightening device may further comprise a casing for securing the balls therein.

The casing comprises a plastic tube in which the balls are positioned. The casing may be an extrusion coating applied to the balls.

Expediently, the rotary tightening device may further comprise a collecting chamber for the drive balls, wherein the balls are guided tangentially along the circumference of the drive wheel for driving the drive wheel and thereafter are collected in the collecting chamber.

The angular distance of interaction between the balls and the gearing is up to 45°.

The drive wheel has a peripheral groove cutting through the cup-shaped recesses and the housing has sword-shaped guides for the mass balls, the sword-shaped guides extending into the groove.

The drive wheel has an inlet region for the balls and an outlet region for the balls, wherein one of the sword-shaped guides is positioned at the inlet region and another of the sword-shaped guides is positioned at the outlet region.

The drive wheel is divided into two halves in the area of the groove and one of the halves is connected to the belt take-up shaft.

The half connected to the belt take-up shaft and the belt take-up shaft are a unitary part.

A first one of the halves consists of a different material than a second one of the halves.

The rotary tightening device may further comprise a collecting device for collecting the mass bodies when exiting from the drive wheel, the collecting device comprising an open, flexible collecting tube and a collecting chamber. The collecting tube opens into the collecting chamber.

The rotary tightening device may instead comprise a collecting device for collecting the mass bodies when exiting from the drive wheel in the form of a folded receptacle positioned within a contour of the rotary tightening device, wherein the receptacle unfolds upon triggering of the rotary tightening device.

In another embodiment of the present invention, the rotary tightening device for a safety belt is primarily characterized by:
 a belt retractor comprising a housing and a belt take-up shaft rotatably supported in the housing, the belt-take-up shaft having one end of the safety belt connected thereto and, upon triggering of the rotary tightening device, being rotated in a belt take-up direction of the safety belt;
 a drive wheel connected to the shaft;
 the housing having a channel extending in a plane parallel to a radial plane of the drive wheel and extending at least partially about a circumference of the drive wheel;
 mass bodies positioned loosely adjacent to one another in the channel;
 the mass bodies, when accelerated, acting on the drive wheel for driving the drive wheel;
 the channel being a tube connected to the belt retractor;
 the tube bent so as to provide a helical course for the mass bodies extending from the outside inwardly toward the shaft and having a decreasing radius along the helical course in a direction toward the shaft.

The rotary tightening device further comprises a cap made of resistant material for mounting the tube to the retractor, wherein the cap has a receiving element for positive-lockingly securing the tube thereat.

The tube preferably has a bead and the cap has a matching throat for receiving the bead.

The tube has a free end with a U-shaped suspending member and the cap has a matching receiver for receiving the U-shaped suspending member.

The tube is mounted in a load-transmitting manner on the housing of the belt retractor.

The rotary tightening device may further comprise a cap, consisting of plastic material, connected to the housing of the belt retractor, wherein the tube is embedded in the cap.

The tube is preferably seamless.

The tube may be comprised of tube halves seam-welded to one another.

The rotary tightening device may comprise a gas generator mounted within the tube, the gas generator accelerating sequentially the mass bodies, when activated, in a longitudinal direction of the gas generator, the tube having securing elements for positive-lockingly securing the gas generator.

The rotary tightening device may also comprise a drive piston consisting of elastic material and positioned between the gas generator and the mass bodies.

The drive piston is secured in the tube at a distance to the gas generator for defining an initial volume, the tube having means for positive-lockingly securing the drive piston.

The rotary tightening device may comprise a spring positioned between the drive piston and the gas generator for supporting the piston.

The drive piston has a periphery with an elastic, outwardly directed spreading means and the tube has a groove positioned in a running direction of the mass bodies at a free end of the tube, wherein the spreading means engages the groove after all mass bodies have been released from the tube.

The tube comprises bores at an end thereof from which the mass bodies are discharged, the bores allowing escape of the propellant of the gas generator.

The rotary tightening device includes a pressure relief device positioned in an area between the drive piston and the gas generator where the initial volume is defined, the pressure relief device comprising a breaking point opening a window for pressure relief when a pressure threshold is surpassed.

The rotary tightening device may also include a collecting device for collecting the mass bodies when exiting from the drive wheel, the collecting device comprising an open, flexible collecting tube and a collecting chamber, the collecting tube opening into the collecting chamber.

The rotary tightening device may include a collecting device for collecting the mass bodies when exiting from the drive wheel in the form of a folded receptacle positioned within a contour of the rotary tightening device, wherein the receptacle unfolds upon triggering of the rotary tightening device.

In principle, the teaching of the invention is such that the driving wheel is provided at its outer periphery with a gearing for receiving the mass bodies, the pitch substantially corresponding to the spacing of the mass bodies. The invention offers the advantage that by means of the gearing formed on the periphery of the driving wheel a form-fit receiving of the mass bodies is realized, as a result of which the power transmission between the mass bodies and the driving wheel for the belt-take-up shaft is markedly improved.

According to an embodiment of the invention, it is provided that the gearing of the driving wheel for receiving the mass bodies is constructed in such a way that the mass bodies, upon engagement so as to overlap the gearing, remain permanently in contact with other; by said means, the efficiency of power transmission is advantageously further improved.

According to an embodiment of the invention, the gearing of the driving wheel is formed by recesses which extend beyond the outer periphery of the driving wheel, the gearing on the periphery of the driving wheel preferably taking the form of cup-shaped recesses which are adapted to the shape-of the mass bodies. The effect thereby achieved is an axial, i.e. lateral, guidance of the mass bodies in the driving wheel as well as synchronous running of the mass bodies in the driving wheel. A simultaneous effect achieved by the receiving of the mass bodies in the cup-shaped recesses is optimum threading of the first mass body to encounter the driving wheel or pass into its periphery after triggering of the drive.

Said cup-shaped construction of the flanks of the corresponding gearing moreover provides a large contact surface for the individual mass bodies, thereby substantially reducing deformation of the two structural parts; extreme deformation of the mass bodies would lead to wedging in the driving wheel and hence ultimately to blocking of the driving wheel.

According to an embodiment of the invention, it is provided that the cup-shaped recesses continuously disposed over the periphery of the driving wheel are contiguous. This offers the advantage of reliably maintaining the thrust connection between the individual adjacent mass bodies as they run through the driving wheel and preventing separation of the mass bodies and hence interruption of the drive flow between the mass bodies as well as power losses for separation of the individual mass bodies. According to an embodiment of the invention, said advantage is enhanced in that the cup-shaped recesses continuously disposed over the periphery of the driving wheel overlap one another by a small amount. In an embodiment of the invention, it is provided that the mass bodies take the form of mass balls and the cup-shaped recesses take the form of spherical half-shells in the driving wheel. To said end, in an embodiment the invention further provides that the radius of the cup-shaped recesses lies on the thrust diameter defined by the theoretical points of contact of the successive mass bodies.

To guarantee efficient threading of the mass balls into the driving wheel, according to an embodiment of the invention a funnel-like widening of the cup-shaped recess is provided, and according to an embodiment of the invention the cup-shaped recesses in each case have a transition between them.

An optimum shape of the transition between the cup-shaped recesses is produced when the transition lies on a circular path between the centres of the cup-shaped recesses, said circular path having a diameter corresponding to the diameter of the cup-shaped recess. To achieve a greater contact ratio between the mass balls and the cup-shaped recesses, the circular path may be disposed on a larger diameter than the thrust diameter.

To achieve threading of the individual mass balls, according to an embodiment of the invention it may be provided that the outside diameter of the driving wheel is greater by up to one mass ball diameter than the thrust diameter of the mass balls.

For greater ease of assembly and precise positioning of the mass balls in the channel, the moulded balls may be "magazined" in a continuous casing and said casing may be deformable in order to improve the inward directing process between the mass balls and the gearing of the driving wheel. By virtue of the continuous casing, a continuous string of mass balls is formed and, by simply cutting said string, a required length having the desired number of bodies may be obtained. The mass balls thus positioned are held by the casing by means of friction in the desired position in the channel, the casing simultaneously also effecting an improved sealing-off of the mass balls from the wall of the channel. According to embodiments of the invention, the casing may comprise a plastics tube, in which the moulded balls are received and positioned, or the casing may alternatively be formed by extrusion-coating the mass balls with a suitable material.

According to an embodiment of the invention, with regard to the course of the channel it is provided that the mass balls are conveyed only on a tangential course past the outer periphery of the driving wheel and, after engagement with the gearing of the driving wheel, pass into a collecting container, with the result that the mass balls do not co-rotate with the driving wheel over a greater angular range, thereby avoiding the friction which would otherwise arise. According to an embodiment of the invention, it is provided that the area of contact between the mass balls and the gearing of the driving wheel extends only over an angle at circumference of up to 45°.

In order to guarantee efficient guidance of the mass balls as they run through, according to an embodiment of the invention it is provided that the driving wheel over its periphery has a groove, which cuts the cup-shaped recesses, for receiving a housing-fixed, sword-shaped guide for the mass balls. Here, it may be sufficient to provide a respective sword-shaped guide on the inlet side of the driving wheel and also on the outlet side of the driving wheel for the mass balls. In so far as the arrangement of a groove is mentioned in DE 29 31 164 Al, said groove, described as a contoured groove, has a different function compared to the groove in the context of the present invention.

According to an embodiment of the invention, it may be provided that the driving wheel in the region of the groove is divided into two parts and one half of the driving wheel is connected to the belt take-up shaft; this enables, in particular, greater ease of assembly of the individual parts of the tightening device. According to an embodiment of the invention, it may then be advantageous for the half of the driving wheel, which is associated with the belt take-up shaft, to be integrally constructed with the belt take-up shaft.

Such a construction of the rotary tightening device moreover allows the two halves of the driving wheel, from a production engineering standpoint, to be manufactured from different materials.

A further aspect of the invention is geared towards the arrangement of the channel in a rotary tightening device and, in said regard, in a special embodiment of the invention it is provided that the channel is formed in a tube disposed in the belt retractor housing and following a helical course, which extends from the outside in towards the belt take-up shaft and has a decreasing radius in relation to the belt take-up shaft.

With regard to the mounting of the tube on the belt retractor housing, according to an embodiment of the invention a cap made of a resistant material is provided, which is provided with a form-fit shaping for fixing the tube on the cap; said form-fit shaping may, according to an embodiment of the invention, be such that the tube is provided with a bead and the cap is provided with a matching throat for receiving the bead of the tube; alternatively, the tube may be suspended by a U-shaped bend disposed at its free end in a correspondingly shaped receiver in the cap. The resistant cap is preferably made of metal, e.g. is an aluminium die casting.

It may likewise be provided that the tube is connected in a load-transmitting manner to the housing of the belt retractor by means of suitable and separate holding devices.

It may however be sufficient to embed and hence fix the tube in a cap made of plastics material, which is connected to the belt retractor.

According to embodiments of the invention, the tube itself may be a seamless structural part or comprise two halves which are seam-welded to one another.

According to an embodiment of the invention, it may be provided that the gas generator is disposed with the mass balls in a line in the axis of the tube, in which case the gas generator is locked and fixed in position through suitable shaping in the tube.

To transmit the drive power from the gas generator to the mass balls, a drive piston made of elastic material is disposed, which drive piston for defining an initial volume may be fixed with clearance relative to the gas generator by means of shapings in the tube. Moreover, it may be provided that, to prevent noise, the drive piston is fixed by means of a supporting spring against the gas generator and is acted upon by the spring.

To prevent the drive piston from coming into contact with the gearing of the driving wheel after the mass balls have run through the tube, the transmission piston may be provided with elastic, outward-acting spreading means, the tube at the relevant end having a groove, into which the spreading means engage and hence fix the drive piston in the tube before the drive piston comes into contact with the driving wheel.

Alternatively, overflow bores which effect stopping of the drive piston may be provided in the tube at the end of the appropriate piston travel.

If, in the realization of the invention, a collecting container has already been provided for the mass balls after they have run through and exited from the channel or the tube, according to an embodiment of the invention there is disposed at the end of the tube an open collecting tube made of a flexible material, which opens into the collecting container and suitably brakes the mass balls as they exit from the channel. To keep the overall size of the rotary tightening device to a minimum, according to the invention the use is further provided of a collapsible collecting device which, when not in use, is situated inside the contour of the tightening device and only upon activation by the mass bodies is unfolded beyond the contour of the belt tightening device.

BRIEF DESCRIPTION OF DRAWINGS

There follows a description of an embodiment of the invention which is illustrated in the drawings. The drawings show.

DESCRIPTION OF PREFERRED EMBODIMENTS

In a manner not shown in greater detail, a belt take-up shaft 10 is rotatably mounted in a belt retractor housing generally of a U-shaped and load-absorbing design. In order to set the belt take-up shaft into a rotation which tightens the webbing wound on the shaft, a pyrotechnically actuated drive is provided, which comprises a driving wheel made up of the two driving wheel halves 11, 12, the driving wheel half 11 in the illustrated embodiment being firmly connected to the belt take-up shaft 10; as FIG. 1 reveals, the second driving wheel half 12 during assembly of the rotary tightening device is then placed against the first driving wheel half 11 and connected thereto by means of a gearing 31. Disposed between the two driving wheel halves 11, 12 is a sword box 13 which is to be associated with the housing of the belt retractor, carries sword-shaped guides 14, 15 extending between the two driving wheel halves 11, 12 and whose inner periphery 30 encloses the outer periphery of the driving wheel 11, 12.

Figure 1:
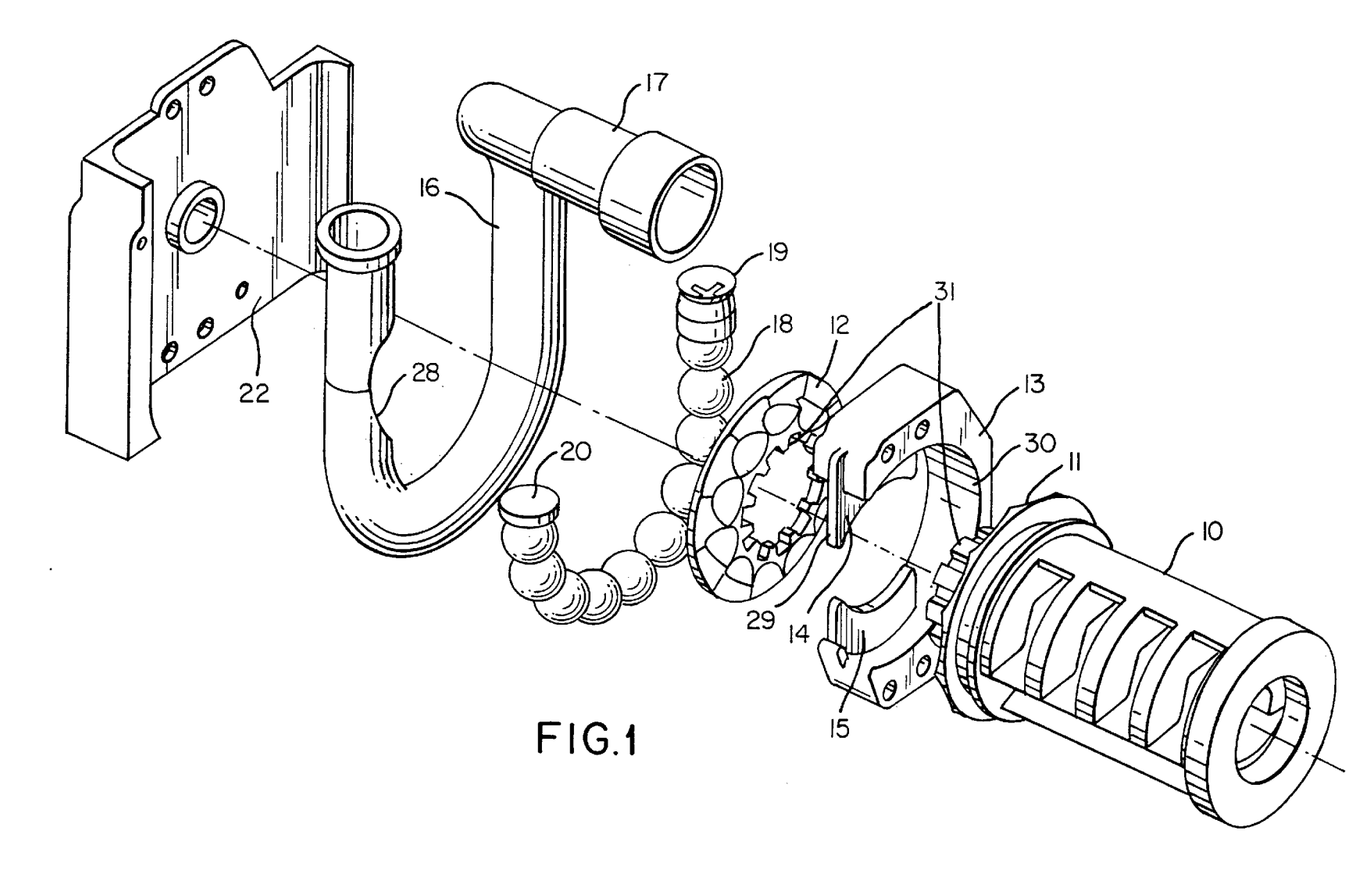
FIG. 1 a three-dimensional view of a belt take-up shaft with a tightening device drive, FIG. 2 a detail view of the driving wheel, FIG. 3 a diagrammatic view of the association between driving wheel and mass balls, FIG. 4 a detail view of a driving wheel with cup-shaped recesses, FIG. 5 the subject of FIG. 1 in another constructional form, FIG. 6 the subject of FIG. 1 in a further constructional form, FIG. 7 another embodiment of a rotary tightening device acting upon the belt take-up shaft of a belt retractor, in a diagrammatic plan view of the front of the belt retractor housing, FIG. 8 another constructional form of the rotary tightening device shown in FIG. 7, FIG. 9 an enlarged view of the connection of the gas generator to the channel in rotary tightening devices according to FIG. 7 or 8.

Disposed in the plane of the sword box 13 and the driving wheel 11, 12 is a curved tube 16, in the inner channel of which are stored the mass balls 18 used to accelerate the driving wheel 11, 12. Disposed at one end of the tube 16 is a gas generator receiver 17 containing a gas generator (not shown in detail), from which in the event of triggering a gas is released and drives the mass balls 18 out of the tube 16; to said end, a drive piston 19 provided with a seal is disposed in the tube 16 and associated with the gas generator receiver 17, while a tube closure 20 is situated at the opposite end. Seated externally on the tube 16 is a cap 22, which is connected to the associated U-limb (not shown) of the belt retractor housing and in the process also carries and supports the tube 16 and the sword box 13.

Figures 2, 3:
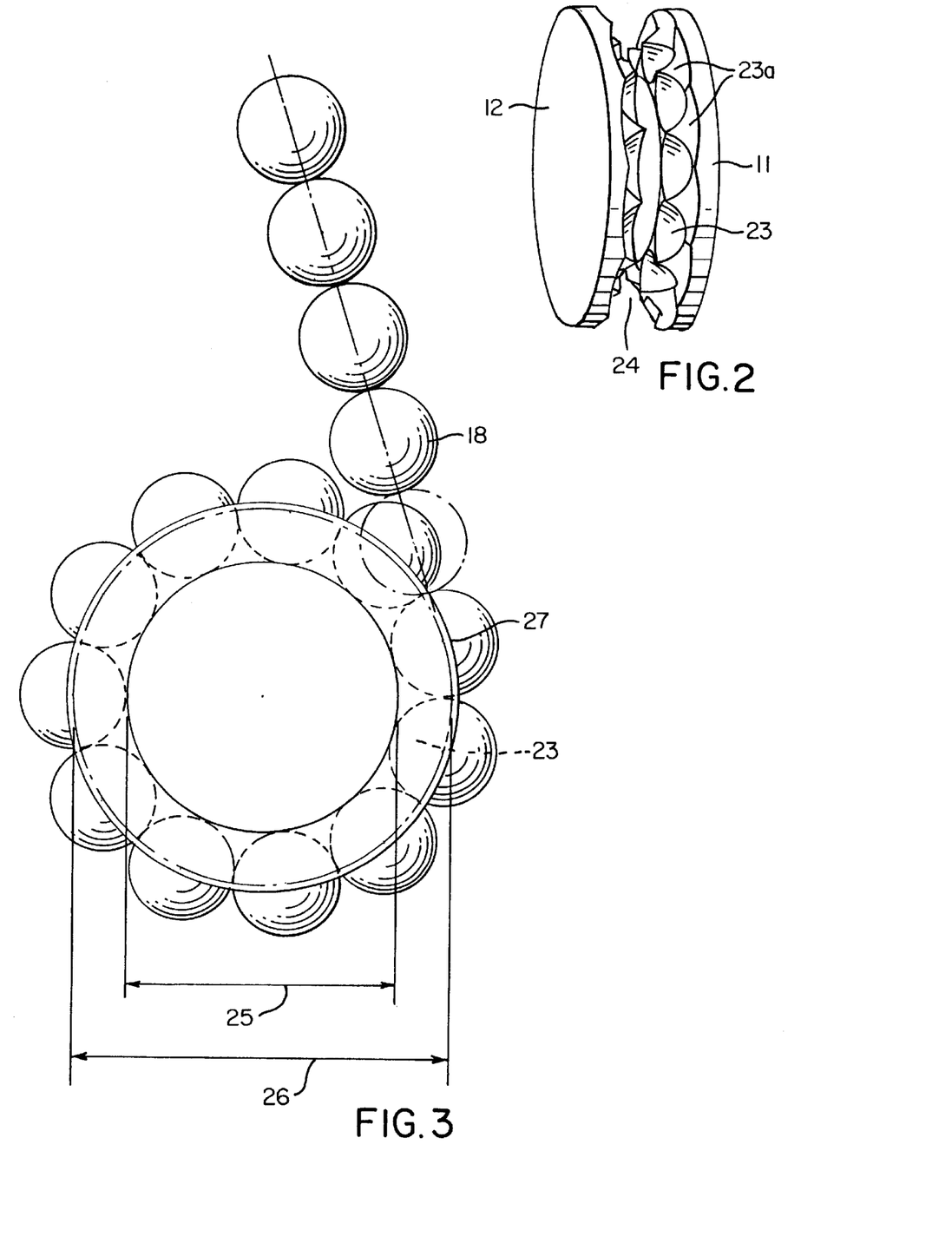

The basic construction of the driving-wheel 11, 12 is revealed in detail in FIG. 2; continuously disposed on the outer periphery of the driving wheel are cup-shaped recesses 23 which are adapted to the shape of the mass balls 18, i.e. have a radius 32 which is identical to, or slightly greater than, that of the mass balls 18.

Figure 4:
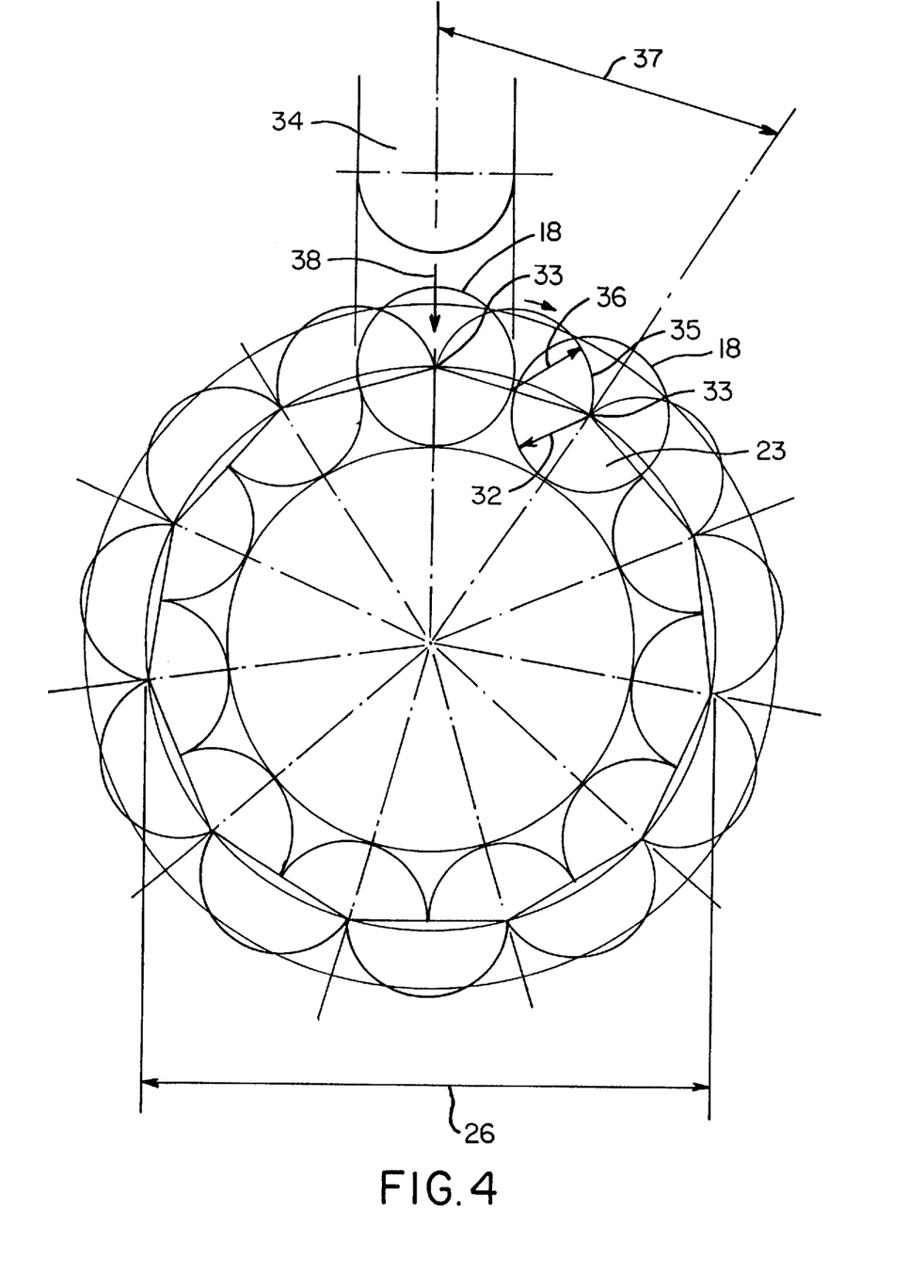

As is shown in detail in FIG. 4, the individual cup-shaped recesses 23 lie on the thrust diameter 26 defined by the theoretical points of contact 33 of the successive mass balls 18. Said thrust diameter 26 may be slightly smaller than theoretically calculated in order to take into account the deformation/flattening of the mass balls 18 under the high surface pressure. The individual cup-shaped recesses 23 are manufactured, for example, by radial infeed 38 of a suitable shaping body, for example a milling cutter 34, the transition 23a between the individual cup-shaped recesses 23 being produced by rolling the milling cutter 34 along a circular path 35 between the points of contact 33, said circular path likewise having a radius 36 corresponding to the radius 32 of the cup-shaped recesses; the illustrated driving wheel 11, 12 has a pitch 37 corresponding to the eleven cup-shaped recesses 23.

As is evident from a combined viewing of FIGS. 1 and 2, the driving wheel comprising the two driving wheel halves 11, 12 has a groove 24, which extends continuously over its periphery and into which the two sword-shaped guides 14, 15 carried by the sword box 13 engage. A sword-shaped guide 15 is first provided in the open inlet region 28 of the mass balls 18 into the driving wheel provided in the tube 16 and facilitates threading of the mass balls 18 into the cup-shaped recesses 23, while a sword-shaped guide 14 acting as a stripper is additionally formed in the outlet region 29, in which the mass balls 18 are to be conveyed back out of the cup-shaped recesses 23 of the driving wheel.

As is evident from FIG. 3, the groove diameter 25 lies radially at the deepest-point of the cup-shaped recesses 23; in the illustrated embodiment, moreover, the outside diameter 27 of the driving wheel 11, 12 is slightly greater than the thrust diameter 26 defined by the theoretical points of contact 33 of the successive mass balls 18.

Upon triggering of the gas generator seated in the gas generator receiver 17, the released gases drive the mass balls 18 stored in the tube 16 out of the tube, the mass balls 18 in the open inlet region 28 being driven in a form-fit manner into the cup-shaped recesses 23 of the driving wheel 11, 12, with assisted guidance by the sword-shaped guide 15 of the sword box 13; the mass balls driven successively in mutual contact radially into the driving wheel 11, 12 set the driving wheel 11, 12 in rotation so that the belt take-up shaft 10 executes the desired rotational movement in tightening direction. After the mass balls 18 have run past radially, the mass balls 18 are removed and collected by means of the sword-shaped guide 14 acting as a stripper. During said process, the sword-shaped guides 14, 15 prevent an escape of the individual mass balls 18 from the desired tangential path into the driving wheel 11, 12 which guarantees optimum power transmission. In order also to guarantee operation of the belt retractor after the tightening process, a clean separation of the mass balls 18 from the driving wheel 11, 12 is provided by the sword-shaped guide 14 acting as a stripper.

Figure 5:
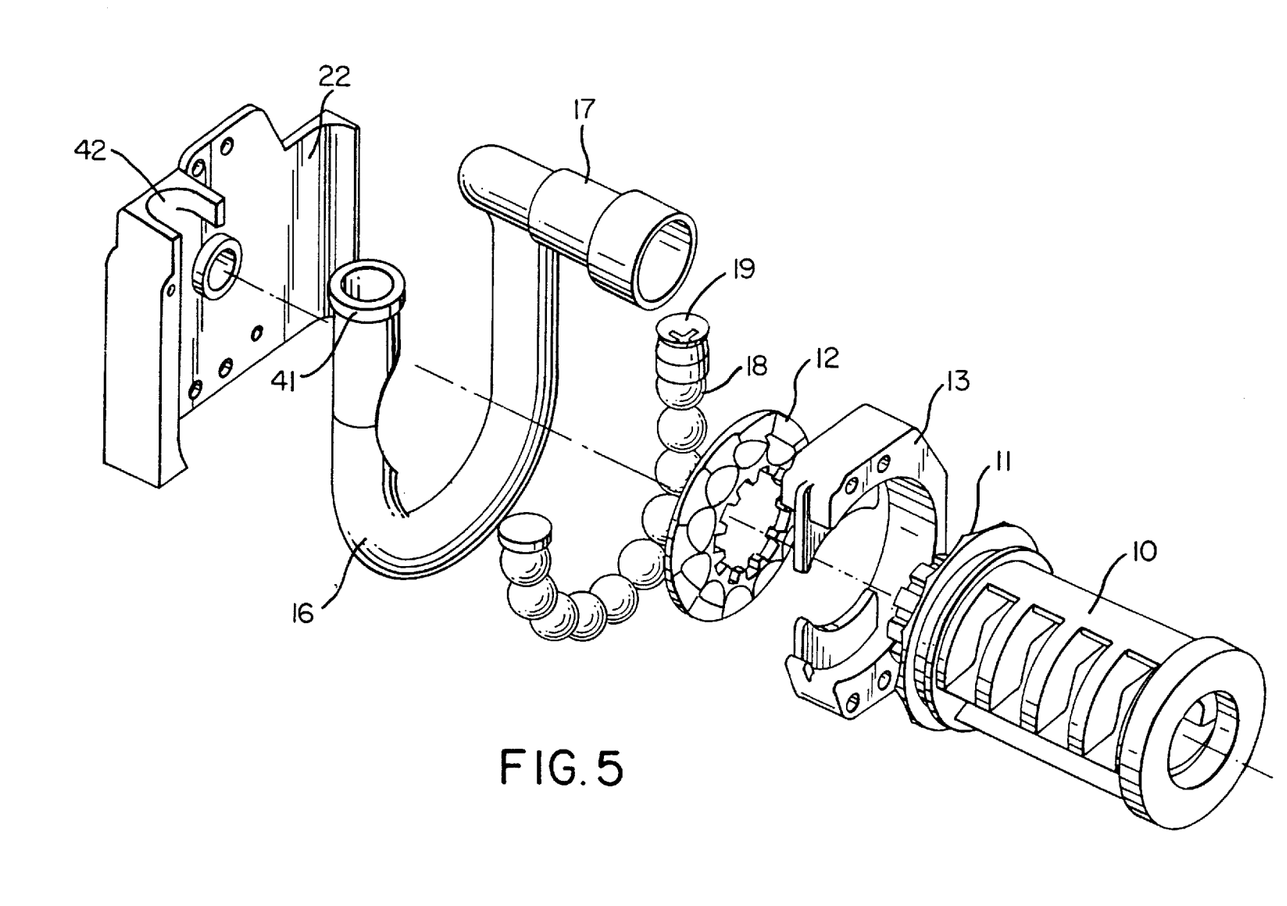
Figure 6:
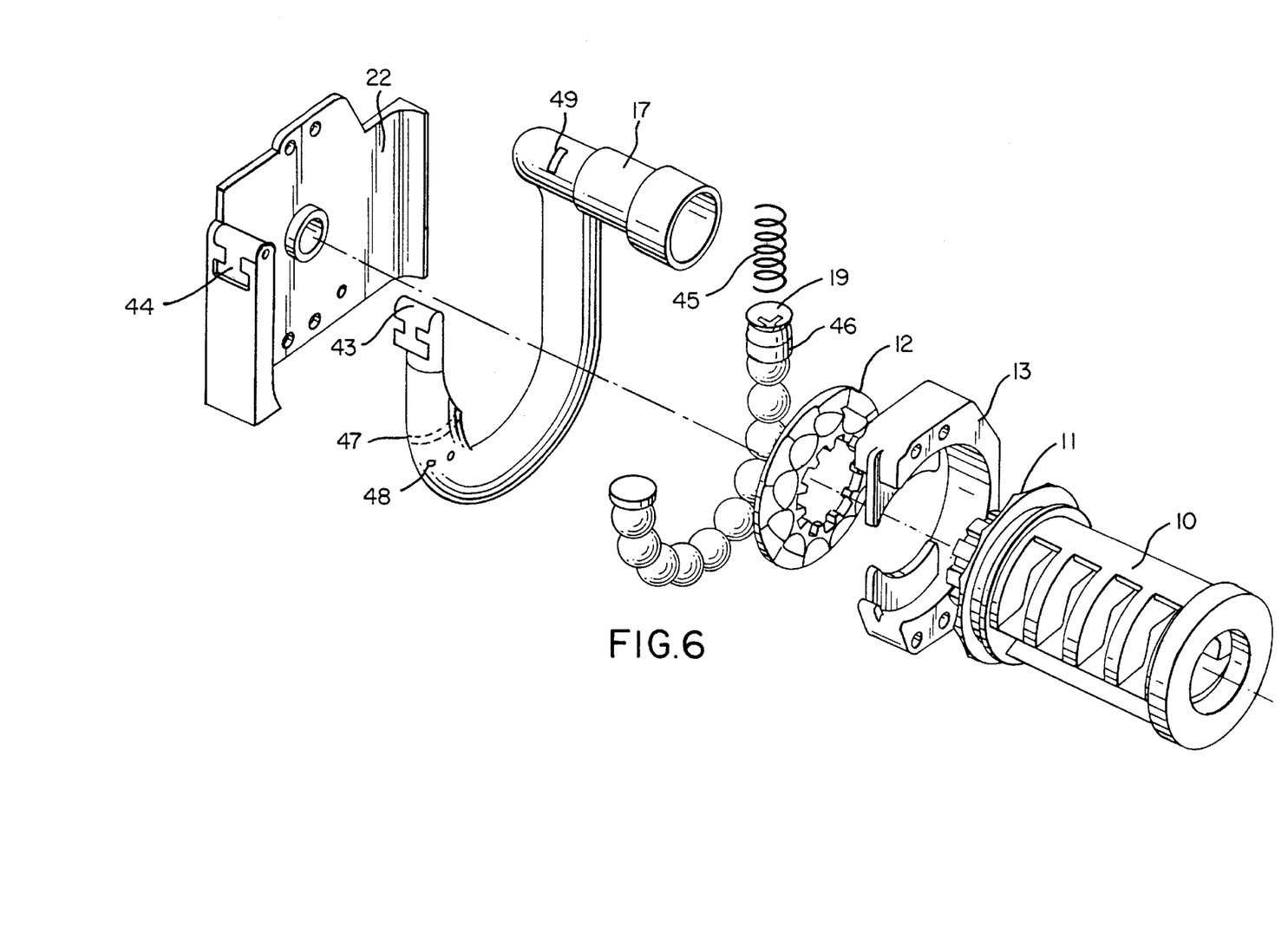

FIGS. 5 and 6 each show different constructions with regard to the mounting of the tube 16 on the cap 22, the cap for absorbing stress being made of metal, preferably being an aluminium die casting, and being firmly connected to the belt retractor housing (not shown). In the embodiment shown in FIG. 5, the tube 16 at its opposite end to the gas generator receiver 17 has a bead 41, associated with which is a correspondingly shaped throat 42 on the cap 22 so that, upon assembly of the structural parts, the tube 16 is fixed on the cap 22. An alternative fastening is shown in FIG. 6, in which the corresponding end of the tube 16 carries a U-shaped bend 43, the free end of which is T-shaped; the cap 22 has a matching receiver 44 of a corresponding shape, at which the tube 16 may therefore be fixed.

FIG. 6 reveals further details, over and above the view of FIG. 1, whereby operation of the rotary tightening device is guaranteed.

Thus, to prevent clattering noises, the drive piston 19 or alternatively the first mass body 18 is supported by means of a supporting spring 45 against the gas generator seated in the gas generator receiver 17. The drive piston 19 further has on its outer periphery elastic, outward-acting spreading means 46 and in the tube 16 there is, associated with said spreading means 46 at the end of the distance to be travelled by the drive piston 19 in the tube 16, a groove 47 in which the spreading means 46 of the drive piston 19 catch, thereby preventing the drive piston 19 from entering the recesses 23 of the driving wheel 11, 12. Alternatively or additionally, overflow bores 48 may be formed in the tube 16 at the relevant end of the operating travel of the drive piston 19, the drive piston 19 upon reaching said overflow bores being no longer pressure-loaded owing the outward flow of the propelling gas and hence being brought to a standstill.

In the region of the transition between the gas generator disposed in the gas generator receiver 17 and the drive piston 19, the gas generator receiver 17 may have a desired breaking point 49, which acts as a pressure relief device in order, e.g. in the event of blocking of the drive, to guarantee safe discharge of the excess pressure generated by the gas generator in the system because, in the event of such excess pressure, the desired breaking point tears open and releases a window enabling the gas to flow off.

Figures 7, 8, 9:
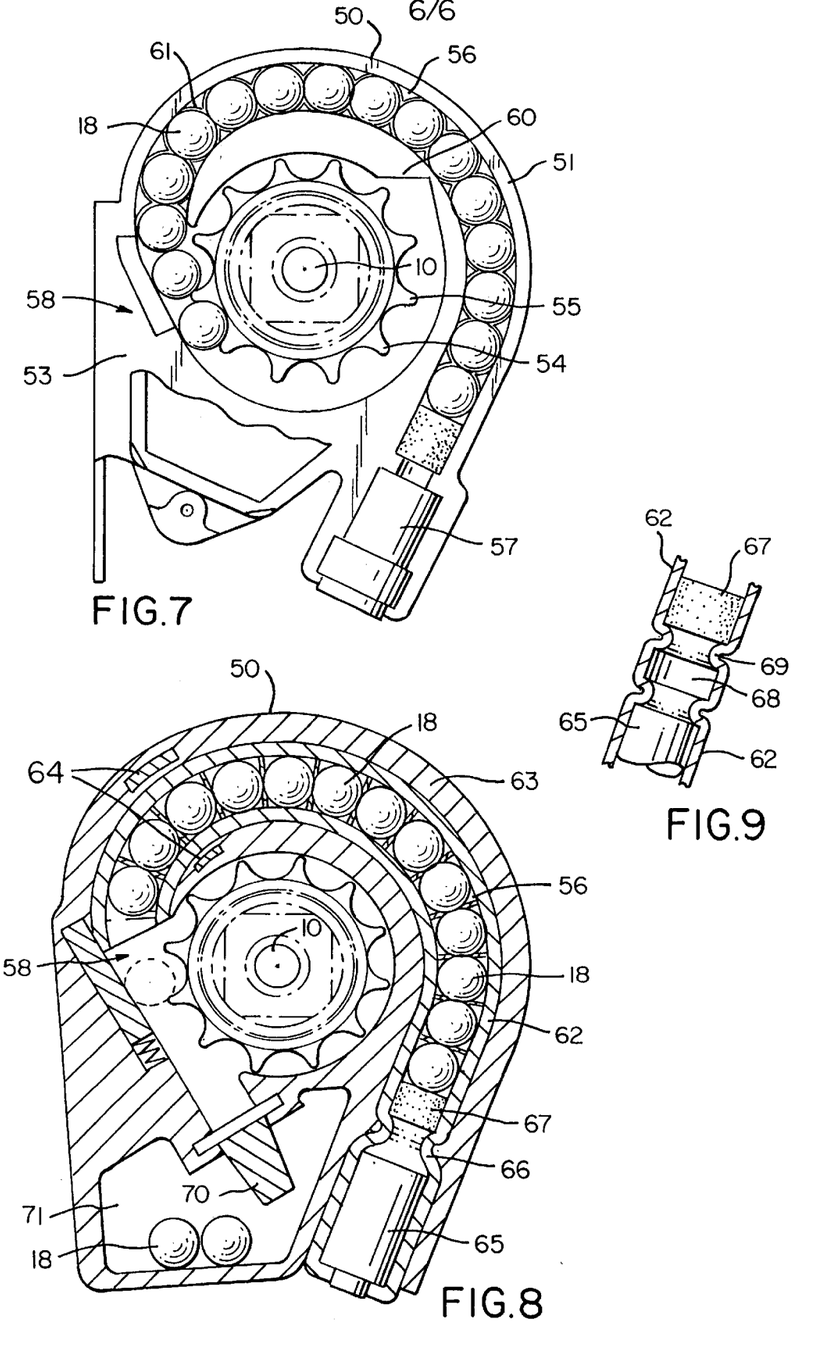

FIGS. 7 and 8 illustrate embodiments of the invention, in which the driving wheel for a rotary tightening device takes the form of a simple pinion provided with an external gearing and is connected to the belt take-up shaft.

In the embodiment shown in FIG. 7, the belt take-up shaft 10 is mounted in a housing 51 of a belt retractor 50 and engages with an axial extension through the associated side limb 53 of the housing 51; mounted on the extension in a keyed manner is a pinion 54 as a driving wheel with an external gearing 55.

The side limb 53 of the housing 51, or a separate structural part mounted thereon, forms within it a channel 56 which at one end has a preferably pyrotechnic unit 57. The channel 56 is formed in the housing 51 or its side limb 53 or the associated structural part with a helical course directed from the outside in towards the belt take-up shaft 10, and indeed with a decreasing radius in relation to the belt take-up shaft 10, until the channel 56 tangentially meets the pinion 54 or its external gearing 55 and at said point forms, for the mass bodies 18 which are situated in the channel 56 and are to be driven in the event of triggering by the pyrotechnic drive unit, an area of engagement 58 with the external gearing 55 of the pinion 54.

The channel 56 encloses part of the periphery of the pinion 54 and opens into an outlet opening 60 in an offset plane, through which the mass bodies 18 driven in the channel 56 leave the channel 56, for which purpose the belt retractor 50 is provided with a collecting container (not shown in detail) of the type basically described in DE 29 31 164 A1.

The mass bodies 18 are surrounded by a continuous casing 61 so that a continuous string of mass bodies is formed. The casing 61 may comprise a plastics tube, in which the mass bodies 18 are introduced and positioned, or alternatively a continiuous and coherent extrusion coating of the individual mass bodies. By cutting the continuous string the required length may be adjusted, said string because of the flexible nature of its material on the one hand effecting a sealing-off of the mass bodies 18 in the channel 56 but at the same time also improving the inward directing process between the mass bodies 18 and the gearing 55 of the pinion 54.

The alternative embodiment of a rotary tightening device shown in detail in FIG. 8 is substantially identical in construction to the embodiment according to FIG. 7 described above and, to said extent, identical parts are provided with the same reference numerals. In the embodiment shown in FIG. 8, the channel 56 extends in a separate and, in accordance with the embodiment of FIG. 7, curved tube 62, which is seamless or comprises two seam-welded halves; the tube 62 is inserted in a cap 63, made of plastics material and connected to the housing 51 of the belt retractor 50, and connected with an interference fit to the housing 51 by means of clamps 64.

Integrated into the tube 62 at its inlet end is a gas generator 65, which is fixed by means of a necking 66 in the tube. Disposed between the outlet of the gas generator 65 and the first mass body 18 is a transmission piston 67 as a drive piston made of an elastic material, said transmission piston 67 in order to form an initial volume 68 being disposed with clearance relative to the gas generator 65 and, on the other hand, being fixed by a shaping 69 in the form of neckings in the manner shown in detail in FIG. 9.

The area of action between the mass balls 18 and the external gearing 55 of the pinion 54 extends only over the tangential region so that the mass balls 18 are in contact with the pinion gearing 55 over an angle at circumference of at most 45° and are then discharged in the opening formed rectilinearly relative to the channel 56. For said purpose, a collecting container 71 is formed in the housing 51, there being associated with the outlet of the channel 56 an open collecting tube 70 made of an elastic material, by means of which the discharged mass balls 18 are braked.

The present invention is, of course, in no way restricted to the specific disclosure of the specification and drawings, but also encompasses any modifications within the scope of the appended claims.

We claim:

1. A rotary tightening device for a safety belt, said rotary tightening device comprising:
   a belt retractor comprising a housing and a belt take-up shaft rotatably supported in said housing, said belt-take-up shaft having one end of the safety belt connected thereto and, upon triggering of said rotary tightening device, being rotated in a belt take-up direction of the safety belt;

a drive wheel connected to said shaft;

said housing having a channel extending in a plane parallel to a radial plane of said drive wheel and extending at least partially about a circumference of said drive wheel;

mass bodies unattached to one another and positioned loosely adjacent to one another in said channel;

said mass bodies, when accelerated, acting on said drive wheel for driving said drive wheel;

said drive wheel having at the circumference a gearing having recceses in which said mass bodies are form fittingly received for driving said drive wheel, wherein a spacing between adjacent recesses of said gearing is substantially identical to a spacing between adjacent ones of said mass bodies.

2. A rotary tightening device according to claim 1, wherein said gearing is designed such that said mass bodies, when received in said gearing, contact one another.

3. A rotary tightening device according to claim 2, wherein said of recesses are projecting radially inwardly from the circumference of said drive wheel.

4. A rotary tightening device according to claim 1, wherein said are cup-shaped and positioned recesses at the circumference of said drive wheel, said cup-shaped recesses having a shape matching a shape of said mass bodies.

5. A rotary tightening device according to claim 4, wherein said cup-shaped recesses are positioned along the entire circumference and are contiguous.

6. A rotary tightening device according to claim 4, wherein said cup-shaped recesses are positioned along the entire circumference and slightly overlap one another.

7. A rotary tightening device according to claim 4, wherein said mass bodies are balls and wherein said cup-shaped recesses are spherical half-shells.

8. A rotary tightening device according to claim 7, wherein a radius of said cup-shaped recesses originates at a circle defined by the theoretical points of contact of successive ones of said balls.

9. A rotary tightening device according to claim 8, wherein each one of said cup-shaped recesses widens radially outwardly in a funnel shape.

10. A rotary tightening device according to claim 8, wherein said cup-shaped recesses have transitions into neighboring ones of said cup-shaped recesses.

11. A rotary tightening device according to claim 10, wherein said transitions between said cup-shaped recesses are produced by rolling a milling cutter for milling said cup-shaped recesses along a circular path, having a radius identical to said radius of said cup-shaped recesses.

12. A rotary tightening device according to claim 7, further comprising a casing for securing said balls therein.

13. A rotary tightening device according to claim 12, wherein said casing comprises a plastic tube in which said balls are positioned.

14. A rotary tightening device according to claim 12, wherein said casing is an extrusion coating applied to said balls.

15. A rotary tightening device according to claim 7, further comprising a collecting chamber for said drive balls, wherein said balls are guided tangentially along the circumference of said drive wheel for driving said drive wheel and thereafter are collected in said collecting chamber.

16. A rotary tightening device according to claim 15, wherein an angular distance of interaction between said balls and said gearing is up to 45°.

17. A rotary tightening device according to claim 7, wherein said drive wheel has a peripheral groove cutting through said cup-shaped recesses and wherein said housing has sword-shaped guides for said mass balls, said sword-shaped guides extending into said groove.

18. A rotary tightening device according to claimed 17, wherein said drive wheel has an inlet region for said balls and an outlet region for said balls, wherein one of said sword-shaped guides is positioned at said inlet region and another of said sword-shaped guides is positioned at said outlet region.

19. A rotary tightening device according to claim 17, wherein said drive wheel is divided into two halves in the area of said groove and one of said halves is connected to said belt take-up shaft.

20. A rotary tightening device according to claim 19, wherein said half connected to said belt take-up shaft and said belt take-up shaft are a unitary part.

21. A rotary tightening device according to claim 19, wherein a first one of said halves consists of a different material than a second one of said halves.

22. A rotary tightening device according to claim 1, herein an outside diameter of said drive wheel is greater than a thrust diameter of said drive wheel by a distance $\leq$ a diameter of said mass bodies.

23. A rotary tightening device according to claim 1, further comprising a collecting device for collecting said mass bodies when said mass bodies are exiting from said drive wheel, said collecting device comprising an open, flexible collecting tube and a collecting chamber, said collecting tube opening into said collecting chamber.

24. A rotary tightening device according to claim 1, further comprising a collecting device for collecting said mass bodies when said mass bodies are exiting from said drive wheel, said collecting device comprising a folded receptacle positioned within a contour of said rotary tightening device, wherein said receptacle is structured to unfold upon triggering of said rotary tightening device.

25. A rotary tightening device for a safety belt, said rotary tightening device comprising:

a belt retractor comprising a housing and a belt take-up shaft rotatably supported in said housing, said belt-take-up shaft having one end of the safety belt connected thereto and, upon triggering of said rotary tightening device, being rotated in a belt take-up direction of the safety belt;

a drive wheel connected to said shaft;

said housing having a channel extending in a plane parallel to a radial plane of said drive wheel and extending at least partially about a circumference of said drive wheel;

mass bodies unattached to one another and positioned loosely adjacent to one another in said channel;

said drive wheel positioned such that said mass bodies, when accelerated, act on said drive wheel for driving said drive wheel;

said channel being a tube connected to said belt retractor;

said tube bent so as to provide a helical course for said mass bodies extending from the outside inwardly toward said shaft and having a decreasing radius along said helical course in a direction toward said shaft.

26. A rotary tightening device according to claim 25, further comprising a cap made of resistant material for mounting said tube to said retractor, wherein said cap has a receiving element for positive-lockingly securing said tube at said cap.

27. A rotary tightening device according to claim 26, wherein said tube has a bead and wherein said cap has a matching throat for receiving said bead.

28. A rotary tightening device according to claim 26, wherein said tube has a free end with a U-shaped suspending member and wherein said cap has a matching receiver for receiving said U-shaped suspending member.

29. A rotary tightening device according to claim 25, wherein said tube is mounted in a load-transmitting manner on said housing of said belt retractor.

30. A rotary tightening device according to claimed 25, further comprising a cap, consisting of plastic material, connected to said housing of said belt retractor, wherein said tube is embedded in said cap.

31. A rotary tightening device according to claim 25, wherein said tube is seamless.

32. A rotary tightening device according to claim 25, wherein said tube is comprised of tube halves seam-welded to one another.

33. A rotary tightening device according to claim 25, further comprising a gas generator mounted within said tube, said gas generator accelerating sequentially said mass bodies, when activated, in a longitudinal direction of said gas generator, said tube having securing elements for positive-lockingly securing said gas generator.

34. A rotary tightening device according to claim 33, further comprising a drive piston consisting of elastic material and positioned between said gas generator and said mass bodies.

35. A rotary tightening device according to claim 34, wherein said drive piston is secured in said tube at a distance to said gas generator for defining an initial volume, said tube having means for positive-lockingly securing said drive piston.

36. A rotary tightening device according to claim 35, further comprising a pressure relief device positioned in an area between said drive piston and said gas generator where said initial volume is defined, said pressure relief device comprising a breaking point forming a window for pressure relief when a pressure threshold is surpassed.

37. A rotary tightening device according to claim 34, further comprising a spring positioned between said drive piston and said gas generator for supporting said piston.

38. A rotary tightening device according to claim 34, wherein said drive piston has a periphery with an elastic, outwardly directed spreading means and wherein said tube has a groove positioned in a running direction of said mass bodies at a free end of said tube, wherein said spreading means engages said groove after all mass bodies have been released from said tube.

39. A rotary tightening device according to claim 33, wherein said tube has an end comprising bores from which end said mass bodies are discharged, said bores allowing escape of the propellant of said gas generator.

40. A rotary tightening device according to claim 25, further comprising a collecting device for collecting said mass bodies when said mass bodies are exiting from said drive wheel, said collecting device comprising an open, flexible collecting tube and a collecting chamber, said collecting tube opening into said collecting chamber.

41. A rotary tightening device according to claim 25, further comprising a collecting device for collecting said mass bodies when said mass bodies are exiting from said drive wheel, said collecting device comprising a folded receptacle positioned within a contour of said rotary tightening device, wherein said receptacle is structured to unfold upon triggering of said rotary tightening device.

\* \* \* \* \*